(12) United States Patent
Moore

(10) Patent No.: US 11,129,515 B1
(45) Date of Patent: Sep. 28, 2021

(54) ARTHROPOD PREVENTION FOOTWEAR MAT ASSEMBLY

(71) Applicant: Charles Moore, Akron, OH (US)

(72) Inventor: Charles Moore, Akron, OH (US)

(*) Notice: Subject to any disclaimer, the term of this patent is extended or adjusted under 35 U.S.C. 154(b) by 64 days.

(21) Appl. No.: 16/819,748

(22) Filed: Mar. 16, 2020

(51) Int. Cl.
*A01M 1/14* (2006.01)
*A47L 23/26* (2006.01)
*A01M 1/20* (2006.01)
*A01M 29/34* (2011.01)

(52) U.S. Cl.
CPC ............. *A47L 23/266* (2013.01); *A01M 1/14* (2013.01); *A01M 1/20* (2013.01); *A01M 1/2011* (2013.01); *A01M 29/34* (2013.01)

(58) Field of Classification Search
CPC ........ A01M 1/14; A01M 1/20; A01M 1/2011; A01M 29/34
USPC .......................................................... 43/121
See application file for complete search history.

(56) References Cited

U.S. PATENT DOCUMENTS

| | | | |
|---|---|---|---|
| 2,911,756 | A | 12/1955 | Geary |
| 4,862,638 | A * | 9/1989 | Stevenson ............... A01M 1/14 43/114 |
| 5,414,954 | A | 5/1995 | Long |
| 5,517,802 | A | 5/1996 | Weder |
| 8,707,615 | B2 | 4/2014 | Cullen |
| 9,320,377 | B2 | 4/2016 | Link et al. |
| 2004/0187377 | A1 | 9/2004 | Gardner, Jr. |
| 2007/0157506 | A1 | 7/2007 | Sadovski et al. |
| 2012/0204477 | A1 | 8/2012 | Fairleigh et al. |
| 2013/0025185 | A1 | 1/2013 | O'Connor |
| 2014/0259879 | A1 | 9/2014 | Logsdon |

* cited by examiner

*Primary Examiner* — Alexander S Thomas
(74) *Attorney, Agent, or Firm* — Renner, Kenner, Greive, Bobak, Taylor & Weber

(57) ABSTRACT

A footwear mat assembly for preventing arthropods from entering footwear stored thereon includes a base including a base top surface including a footwear storage location adapted to receive a pair of footwear, and a raised barrier including a barrier bottom surface adhesively and removably secured to the base top surface, a barrier top surface carrying an arthropod-securing adhesive composition layer, and a barrier inner perimeter defining an opening adapted to receive the pair of footwear therethrough for placement on the footwear storage location.

18 Claims, 12 Drawing Sheets

ARTHROPOD PREVENTION FOOTWEAR MAT ASSEMBLY

FIELD OF THE INVENTION

The present invention relates to a footwear mat assembly for preventing arthropods and other small creatures from entering footwear stored on the footwear mat assembly.

BACKGROUND OF THE INVENTION

U.S. Publication No. 2013/0025185 discloses an insect barrier in the form of a plate, coaster, or block having an upper support surface with an insect free region for supporting an article (e.g. a container of food) to be preserved from contact with insects. The assembly of the '185 Publication further includes a circuit formed about the insect free region that has a crawling insect physical repellent, such as diatomaceous earth.

U.S. Publication No. 2014/0259879 discloses an apparatus for killing target pests using strategically designed moats. The moats are constructed of barrier material that is difficult for the target pests to traverse, material that is easy for the target pests to traverse, and killing material, which tends to kill the target pests after they have made adequate contact with it. These elements are strategically positioned so that target pests that are attracted to a bait travel along a long zigzag path parallel to the barrier material. In certain embodiments, a protected item is supported on a block, which could be constructed of durable wood.

U.S. Pat. No. 5,414,954 discloses a film of material that may be laid around the periphery of many different objects in order to prevent insects from crawling up the periphery of the objects. In certain embodiments, the film of material is utilized to protect a pet food dish, having a base and a side wall. A portion of the side wall is coated with a film of material extending around the entire periphery of the pet dish. The '954 Patent states that the film will prevent ants and other crawling insects from climbing up the sidewall and into the pet dish. The '954 Patent generally states that the films also may be applied to mats, platforms, outdoor furniture, and other articles that are designed to rest on or be supported by the ground. The '954 Patent states that the film-treated surfaces should be skewed at least about 20 degrees to a horizontal axis.

U.S. Pat. No. 5,517,802 discloses an assembly including a sticky element having an insect-attracting color and an insect-attracting scent. The sticky element has sufficient sticky qualities to cause an insect to become permanently attached to the sticky element when any portion of the insect contacts with the sticky element. The sticky element is taught as being adaptable to being disposed upon a surface. The surface may be a wrapping material, a flower pot cover, a flower pot, a floral arrangement, or other surface. When the sticky element is disposed on a wrapping material, the wrapping material is used to wrap a floral arrangement or decoratively cover a flower pot.

There remains a need in the art for an improved footwear mat assembly for preventing arthropods and other small creatures from entering footwear stored on the footwear mat assembly.

SUMMARY OF THE INVENTION

In one embodiment, the present invention provides a footwear mat assembly for preventing arthropods from entering footwear stored thereon including a base including a base top surface including a footwear storage location adapted to receive a pair of footwear, and a raised barrier including a barrier bottom surface adhesively and removably secured to the base top surface, a barrier top surface carrying an arthropod-securing adhesive composition layer, and a barrier inner perimeter defining an opening adapted to receive the pair of footwear therethrough for placement on the footwear storage location.

In another embodiment, the present invention provides a footwear mat assembly including a base including a base top surface including a footwear storage location adapted to receive a pair of footwear, the footwear storage location including two defined locations generally corresponding to the shape of a pair of footwear to be stored, and a raised barrier including a barrier bottom surface adhesively and removably secured to the base top surface, a barrier outer sidewall defining an outer perimeter of the raised barrier, a barrier inner sidewall defining an opening adapted to receive the pair of footwear to be stored therethrough for placement on the footwear storage location, and a channel extending between the barrier outer sidewall and the barrier inner sidewall, the channel carrying an arthropod-securing adhesive composition layer.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

One or more embodiments of the present invention provide a footwear mat assembly, which may be particularly useful for preventing arthropods and other small creatures from entering footwear stored on the footwear mat assembly. The footwear mat assembly includes a base for storing the footwear and a barrier, which may also be referred to as a raised barrier, positioned on the base. A bottom surface of the raised barrier may be removably affixed with the base by a removably-affixed adhesive such that a used raised barrier may be disposed of, and replaced with a new raised barrier, without needing to dispose the base. At least one surface of the raised barrier includes an arthropod-securing adhesive composition. The raised barrier should be of sufficient dimensions (e.g. perimeter thickness and/or height thickness) such that the arthropod-securing adhesive composition disposed thereon is suitably capable of preventing arthropods from entering footwear stored on the footwear mat assembly. As used herein, the term arthropods may be used to generally describe all creatures that may seek to enter footwear stored on the footwear mat assembly. It should be appreciated that, in addition to arthropods (e.g. ants, spiders, and scorpions), other small creatures (e.g. worms) may also be prevented from reaching the footwear stored in the footwear mat assembly.

With reference to the Figures, a footwear mat assembly according to one or more embodiments of the present invention is generally indicated by the numeral 10. Footwear mat assembly 10 may also be referred to as arthropod-prevention assembly 10, mat assembly 10, or mat 10.

Figure 1:
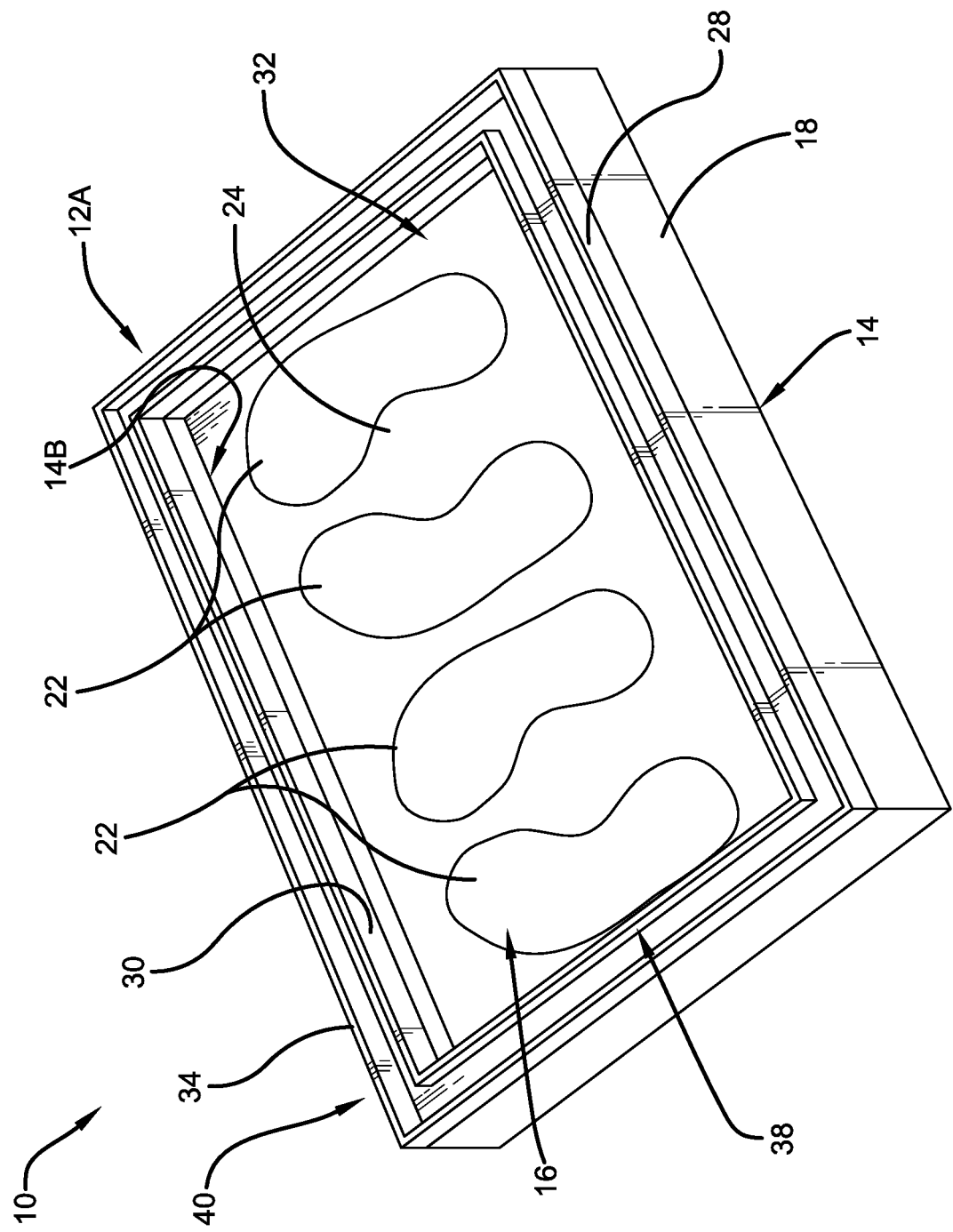
FIG. 1 is a perspective view of a footwear mat assembly according to one or more embodiments of the present invention, shown with a sidewalled barrier shown on a base, with the base including a sunken portion.
Figure 2:
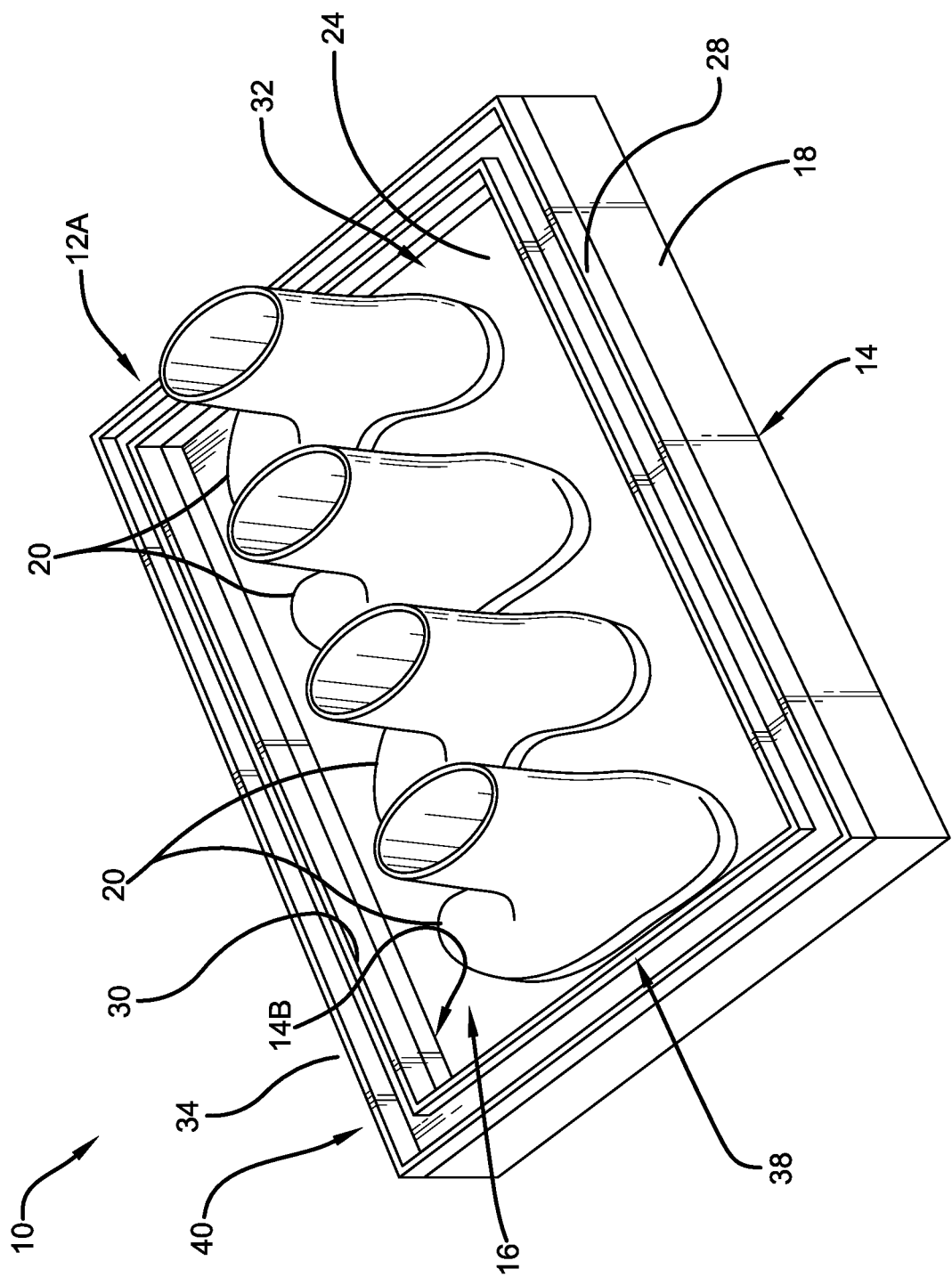
FIG. 2 is a perspective view of the footwear mat assembly shown in FIG. 1, shown with footwear on the base of the assembly.
Figure 3:
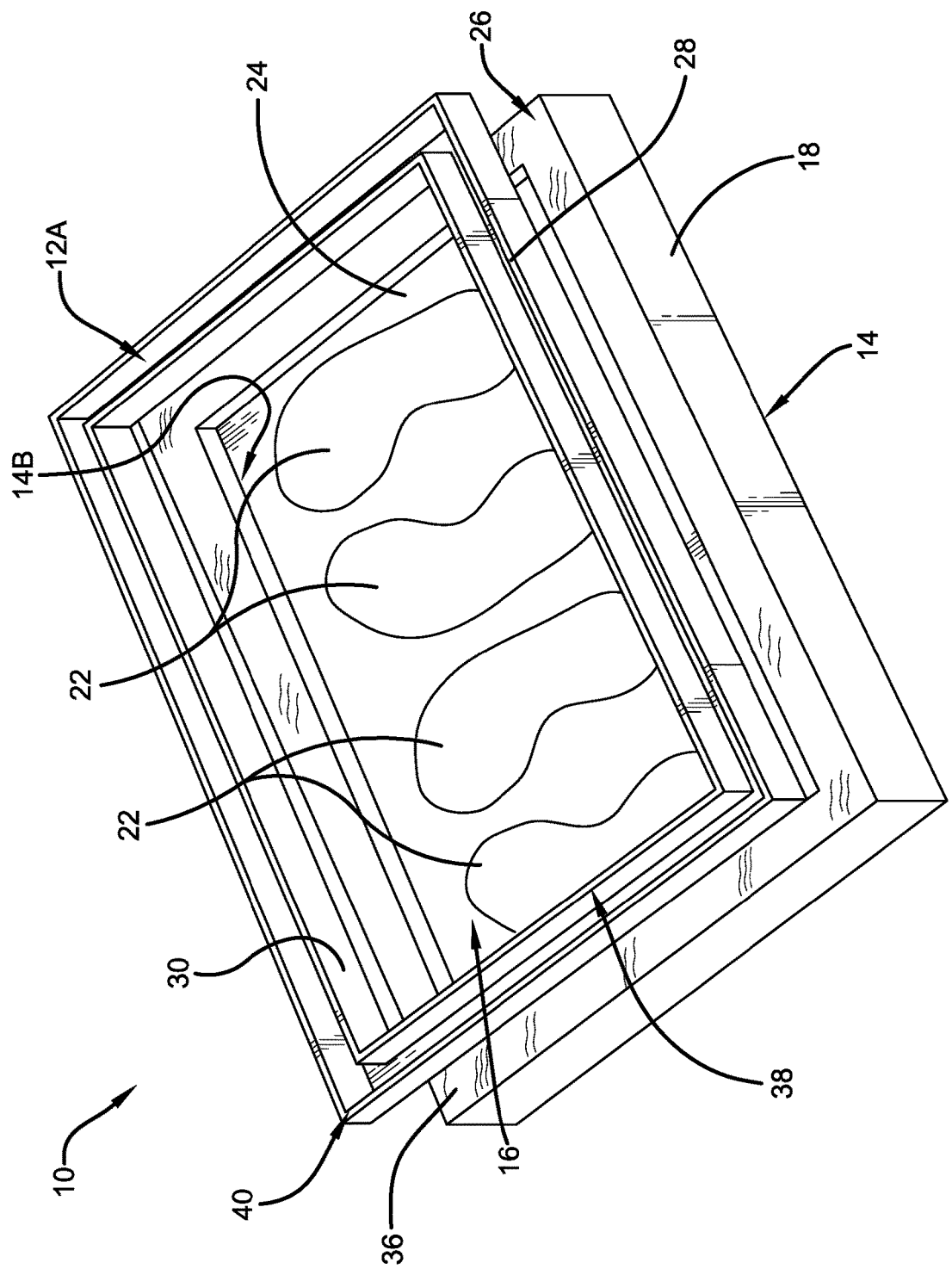
FIG. 3 is a perspective view of the footwear mat assembly shown in FIG. 1, shown with the non-layered barrier removed from the base.

In one or more embodiments, and with reference to FIGS. 1-3, footwear mat assembly 10 may include a sidewalled barrier 12A positioned on a base 14. In one or more embodiments, and with reference to FIGS. 1-3, base 14 may include a sunken portion 14B. In other embodiments, and with reference to FIGS. 4-12, base 14 may be without a sunken portion and may be referred to as entirely flat or substantially flat. In one or more embodiments, and with reference to FIGS. 4-6, footwear mat assembly 10 may include a non-layered raised barrier 12B positioned on base 14. In other embodiments, and with reference to FIGS. 7-9, footwear mat assembly 10 may include a support-article raised barrier 12C positioned on base 14. In one or more embodiments, and with reference to FIGS. 10-12, footwear mat assembly 10 may include a layered raised barrier 12D positioned on base 14. As will be further described herein below, in one or more embodiments, aspects of sidewalled barrier 12A, non-layered raised barrier 12B, support-article raised barrier 12C, and layered raised barrier 12D may be interchanged.

Base 14 includes a top surface 16 and a bottom surface (not seen), which are both parallel or substantially parallel to the ground when footwear mat assembly 10 is positioned on the ground. Base 14 may therefore be referred to as having flat or substantially flat surfaces.

In some embodiments, base 14 may include a sunken portion 14B for storage of stored footwear 20. As shown in FIGS. 1-3, sunken portion 14B includes top surface 16 being positioned slightly below the top of side surfaces 18. In one or more embodiments, this positional difference between top surface 16 and the top of side surfaces 18 may be in a range of from about 0.25 inches to about 0.5 inches, in other embodiments, from about 0.25 inches to about 1 inch, in other embodiments, from about 0.5 inches to about 1 inch, and in other embodiments, from about 0.75 inches to about 1 inch. In other embodiments, where sunken portion 14B is not present, this positional difference between top surface 16 and the top of side surfaces 18 is not present.

Side surfaces 18 form an outer perimeter of base 14. In some embodiments, side surfaces 18 extend between top surface 16 and the bottom surface of base 14. As mentioned above, where sunken portion 14B is present, side surfaces 18 extend slightly above top surface 16. Any arthropods seeking to enter stored footwear 20 positioned on base 14 would need to traverse both side surfaces 18 and the raised barrier (e.g. barrier 12A).

Figure 4:
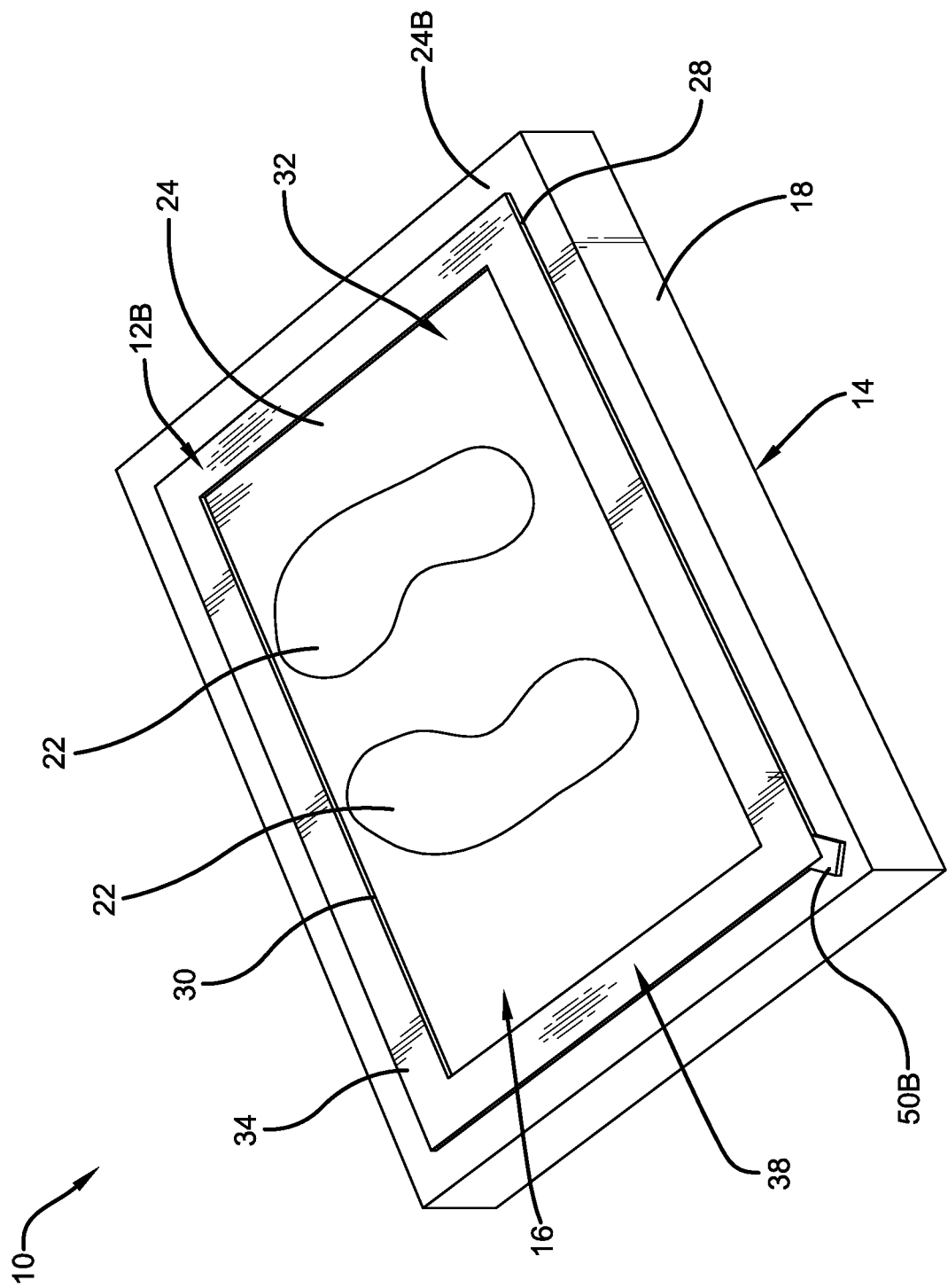
FIG. 4 is a perspective view of a footwear mat assembly according to one or more embodiments of the present invention, shown with a non-layered barrier on the base, with the base not including the sunken portion.
Figure 5:
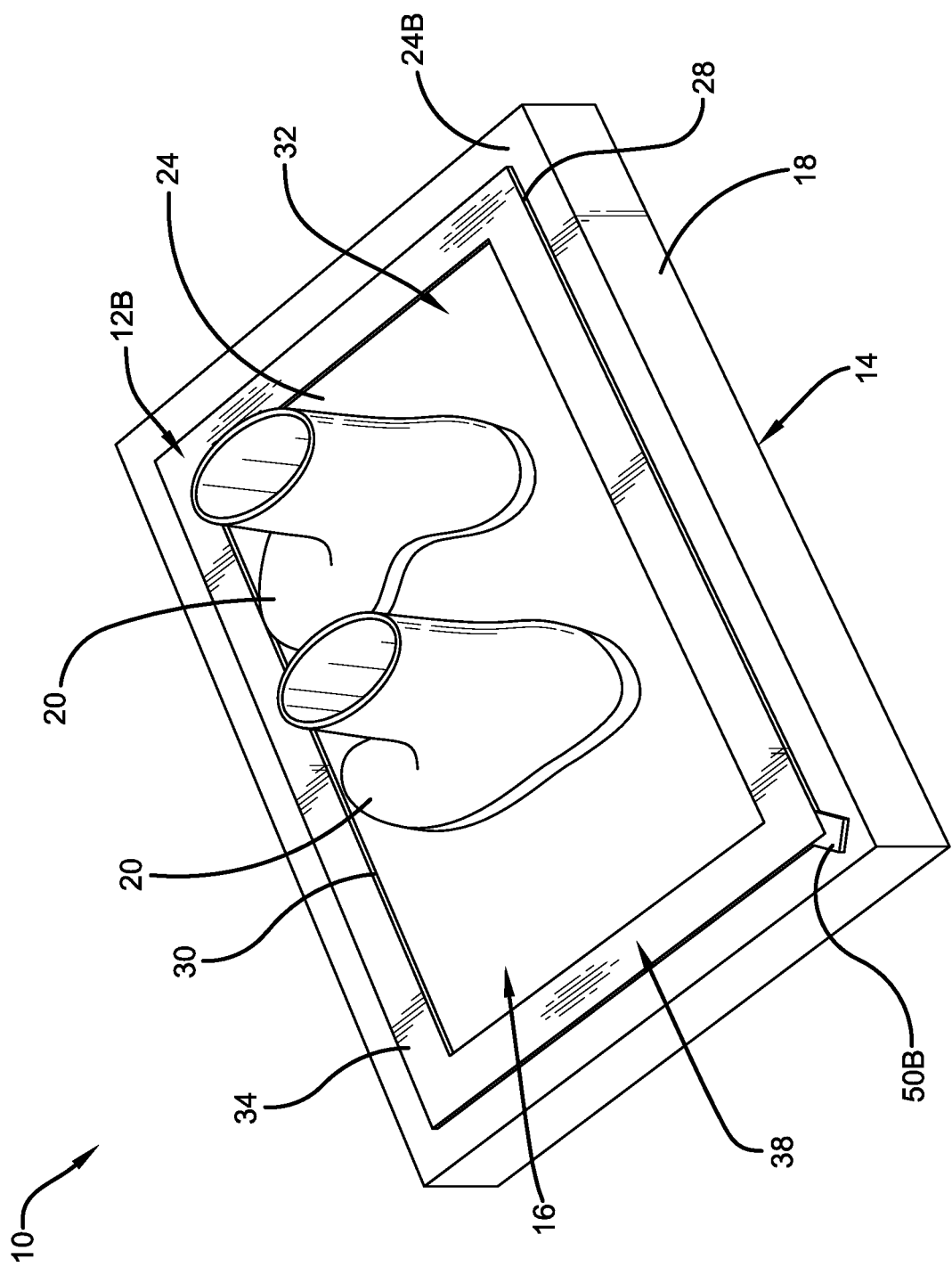
FIG. 5 is a perspective view of the footwear mat assembly shown in FIG. 4, shown with footwear on the base of the assembly.
Figure 6:
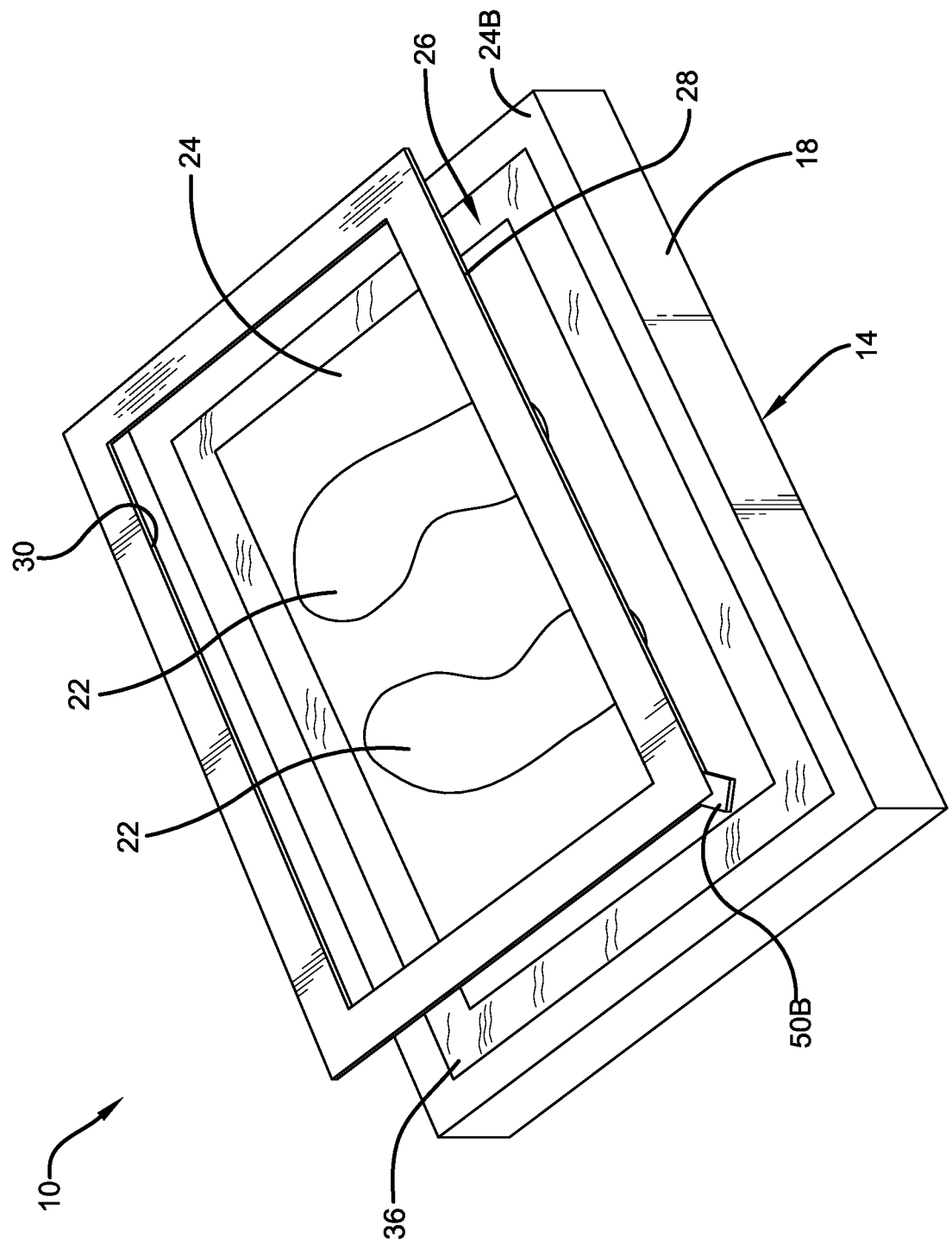
FIG. 6 is a perspective view of the footwear mat assembly shown in FIG. 4, shown with the non-layered barrier removed from the base.
Figure 7:
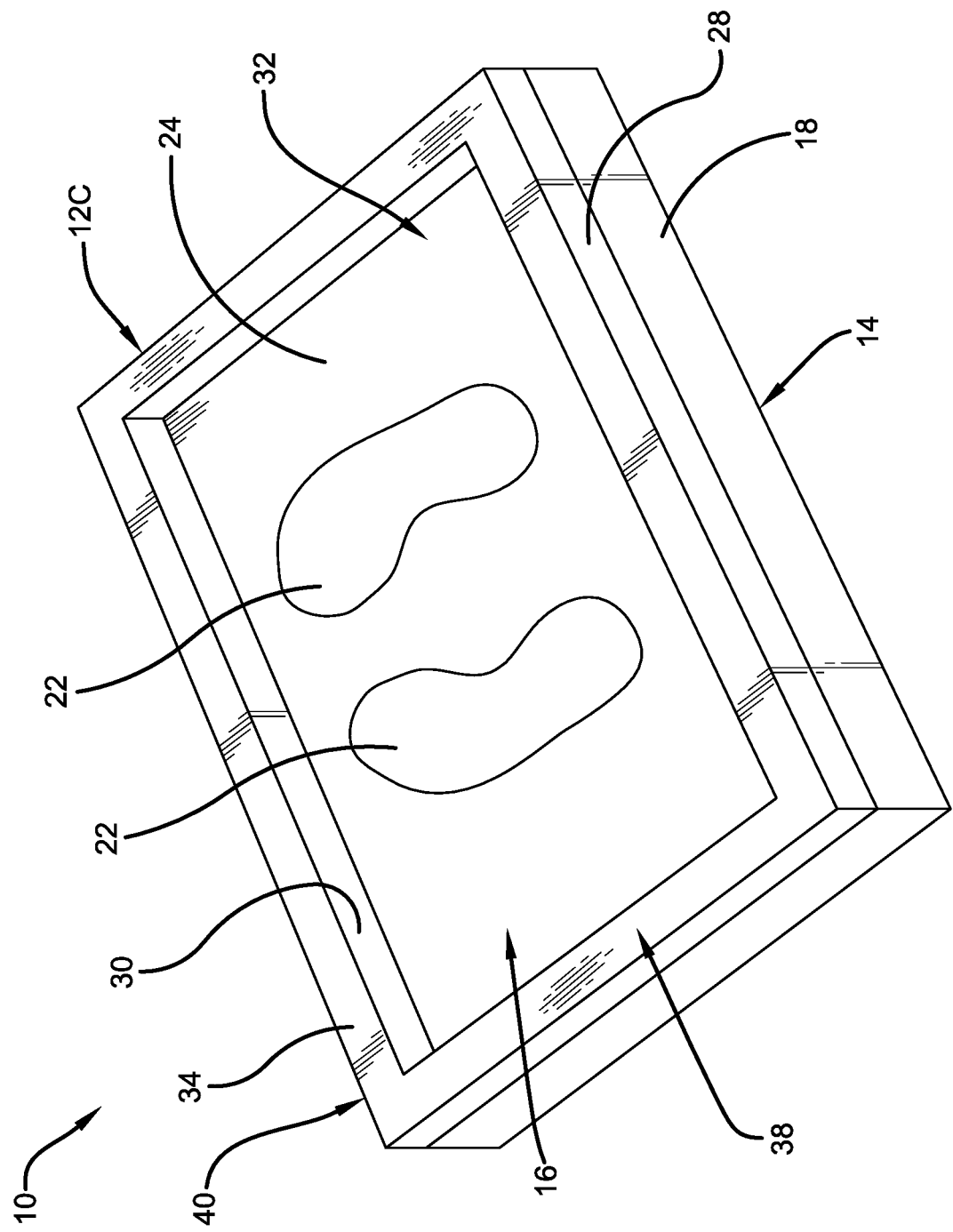
FIG. 7 is a perspective view of a footwear mat assembly according to one or more embodiments of the present invention, shown with a support-article barrier on the base.
Figure 8:
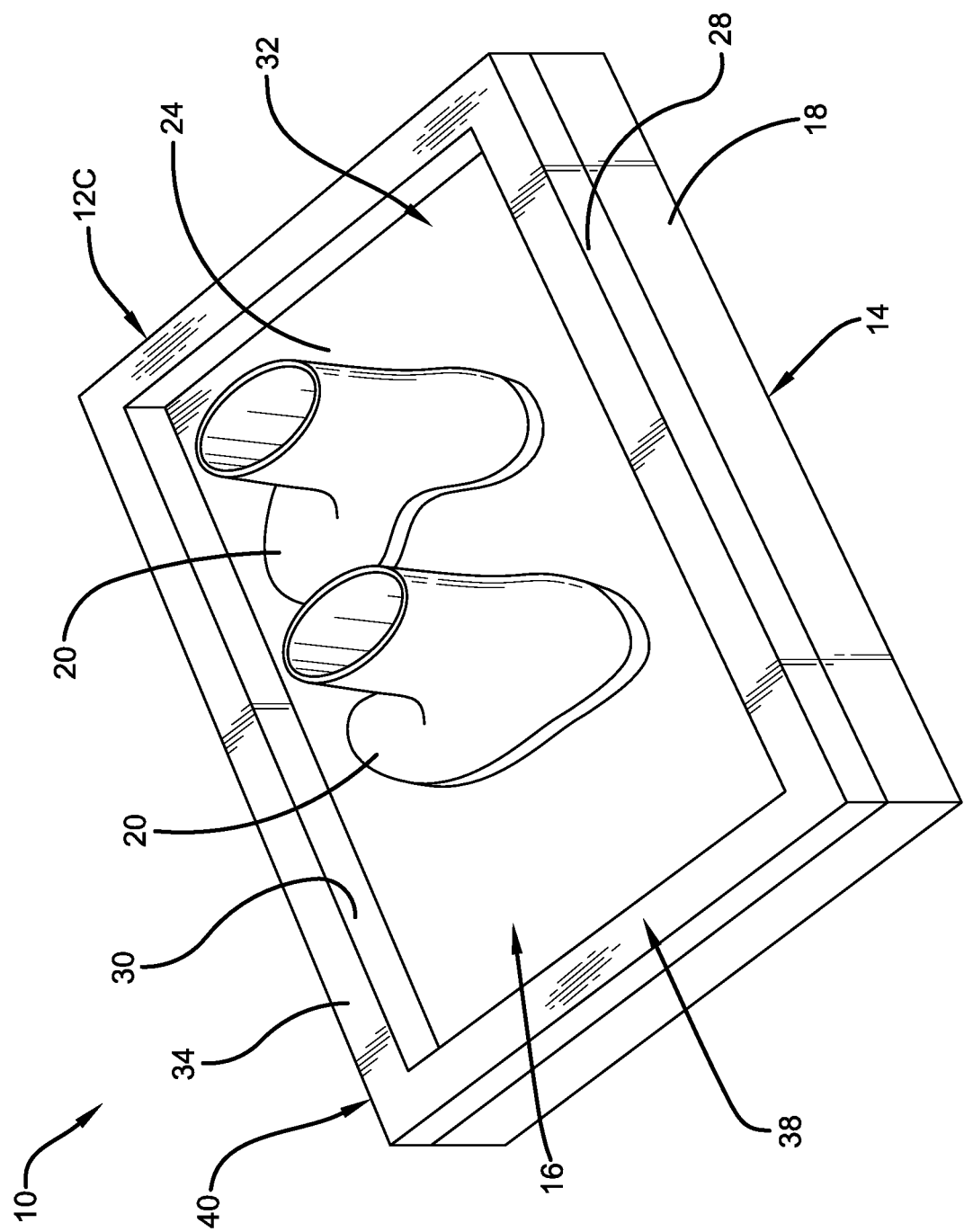
FIG. 8 is a perspective view of the footwear mat assembly shown in FIG. 7, shown with footwear on the base of the assembly.
Figure 9:
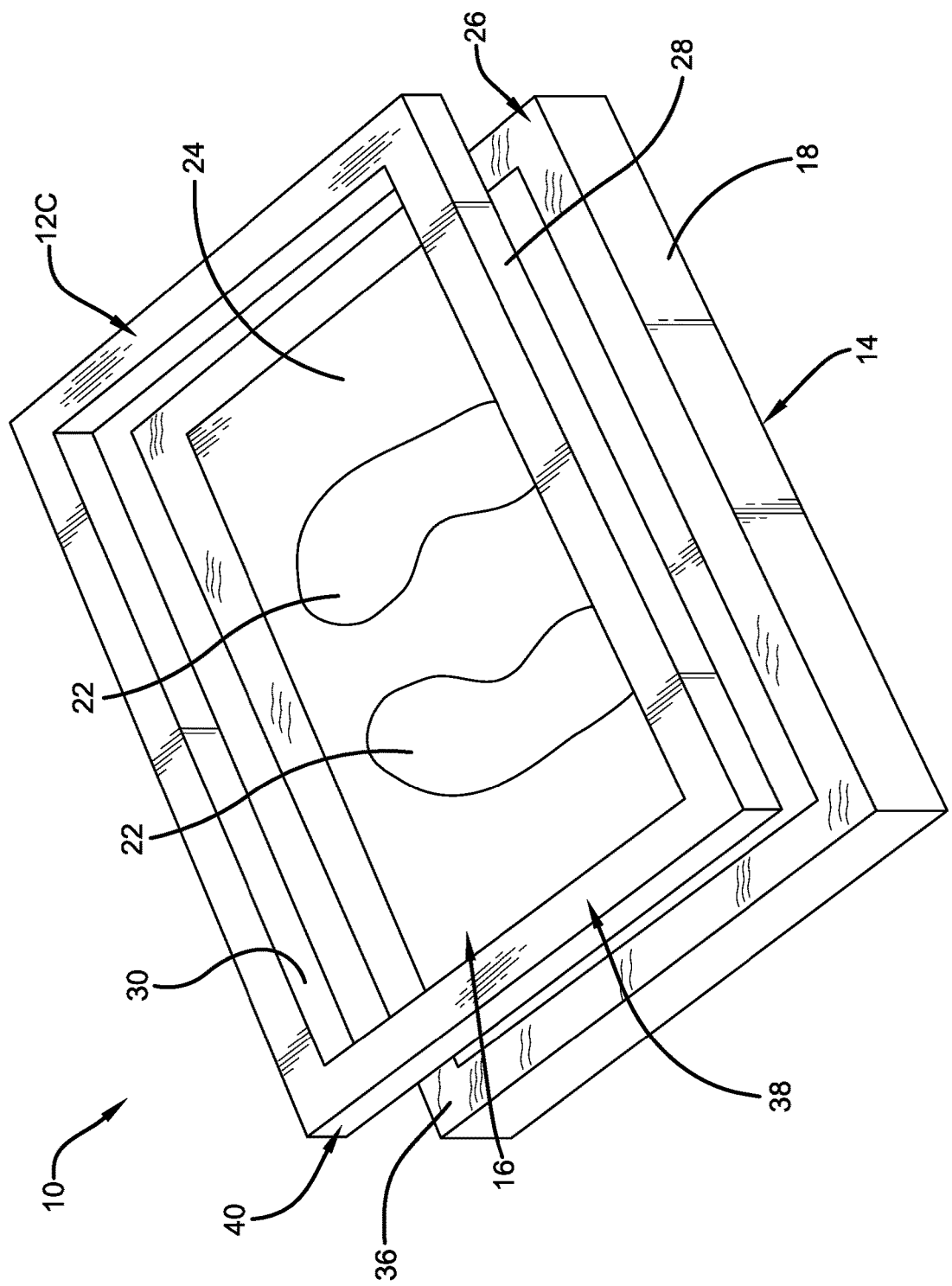
FIG. 9 is a perspective view of the footwear mat assembly shown in FIG. 7, shown with the barrier removed from the base.
Figure 10:
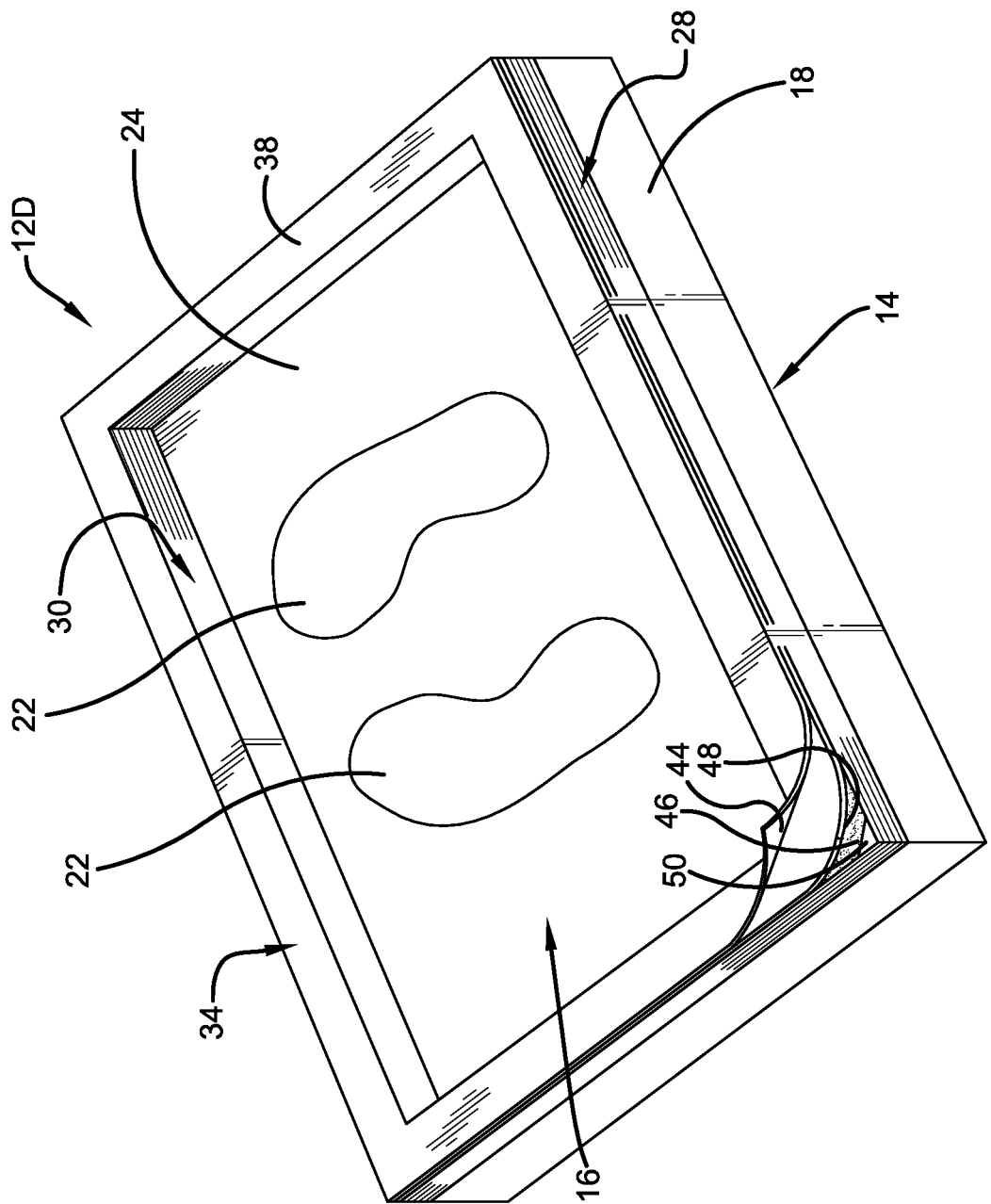
FIG. 10 is a perspective view of a footwear mat assembly according to one or more embodiments of the present invention, shown with a layered barrier on the base.
Figure 11:
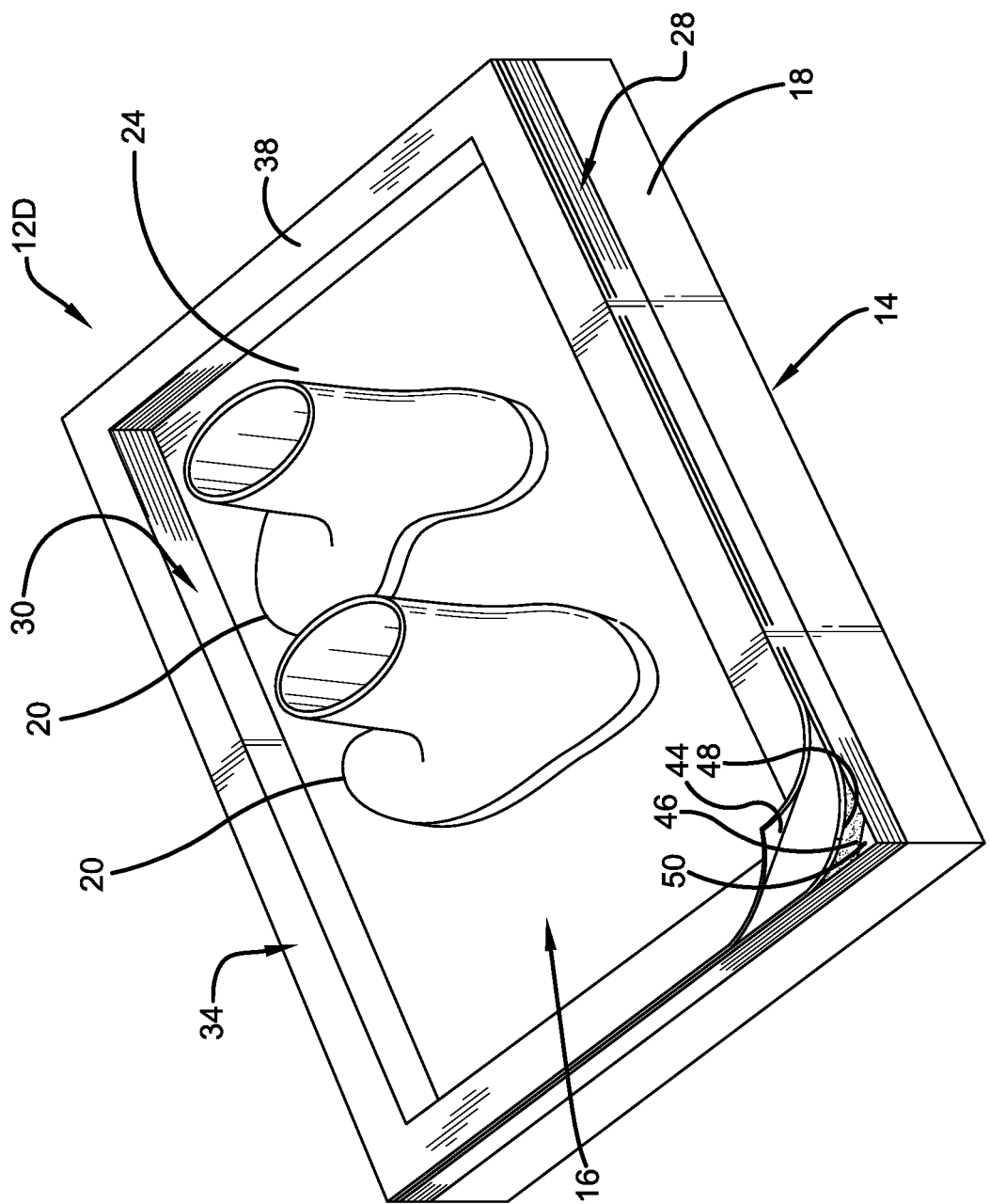
FIG. 11 is a perspective view of the footwear mat assembly shown in FIG. 10, shown with footwear on the base of the assembly.
Figure 12:
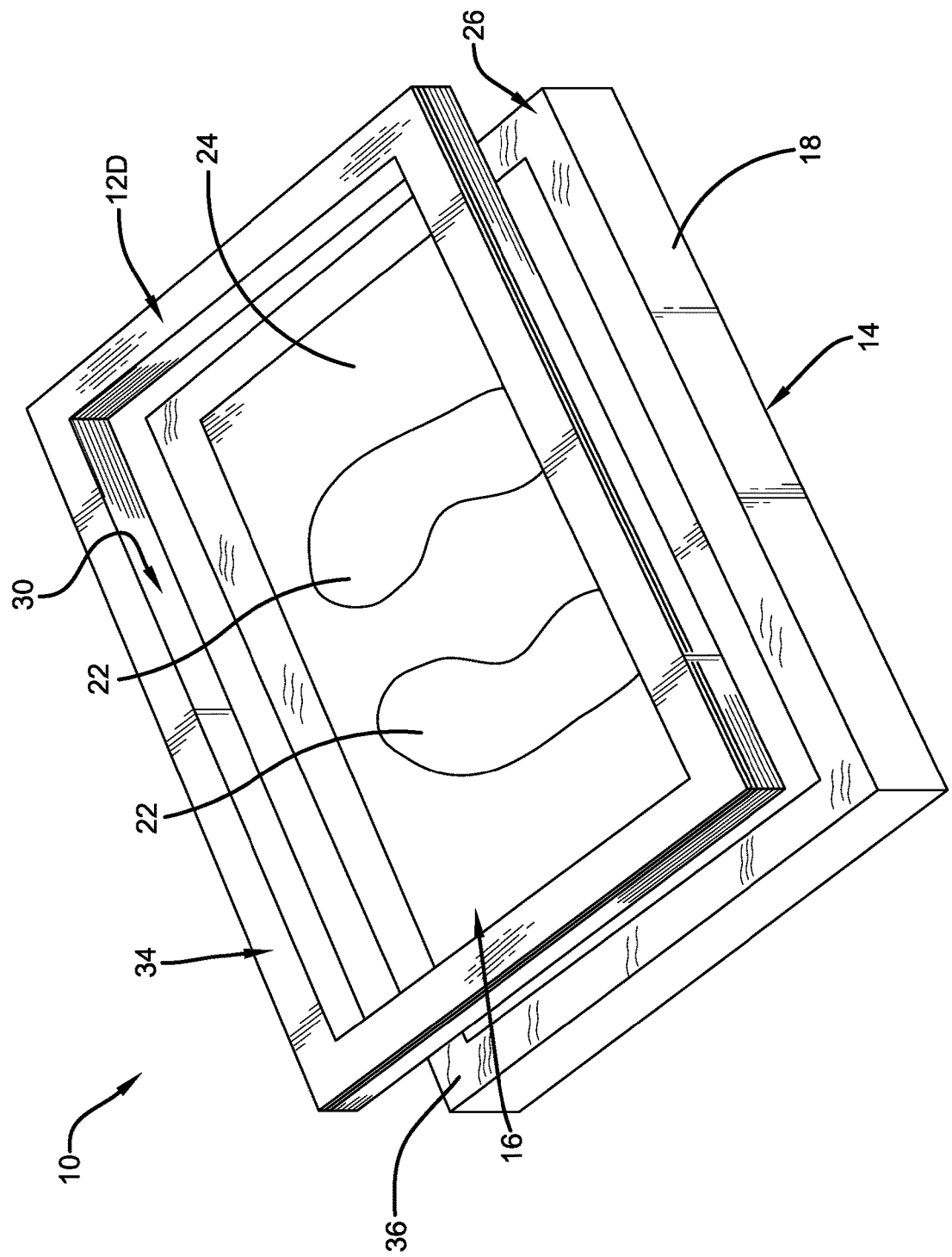
FIG. 12 is a perspective view of the footwear mat assembly shown in FIG. 10, shown with the layered barrier removed from the base.

The combination of side surfaces 18 may therefore be referred to as the outer perimeter of base 14. In one or more embodiments, such as shown in FIGS. 4-6, the outer perimeter of base 14 may be offset from the outer perimeter of the raised barrier (e.g. non-layered raised barrier 12B). In other embodiments, such as shown in FIGS. 1-3 and 7-12, the outer perimeter of base 14 corresponds with or substantially corresponds with the outer perimeter of the raised barrier (e.g. support-article raised barrier 12C).

In one or more embodiments, base 14 may be substantially devoid of or entirely devoid of an arthropod-securing adhesive composition, such as the arthropod-securing adhesive composition that is present on at least one surface of the raised barrier. Such arthropod-securing adhesive compositions will be further discussed herein below. In these embodiments, as suggested elsewhere herein, a used raised barrier could be disposed of, and replaced with a new raised barrier, without needing to dispose of base 14. If base 14 included an arthropod-securing adhesive composition, then base 14 would retain arthropods, which may be undesirable for users.

Base 14 may be made of any suitably sturdy material for supporting the raised barrier and footwear 20. Exemplary materials for base 14 include plastic, cardboard, rubber, wood, and metal.

In one or more embodiments, the bottom surface of base 14 may include a further gripping layer (not shown) for providing additional gripping capability with respect to the bottom surface and the ground. An exemplary material for the further gripping layer is rubber.

Base 14 may have a height, as measured from the bottom surface to top surface 16 in a range of from about 0.5 inches to about 2.0 inches, in other embodiments, from about 0.5 inches to about 1.5 inches, in other embodiments, from about 0.5 inches to about 1 inch, and in other embodiments, from about 1 inch to about 1.5 inches. As suggested elsewhere herein, the height may also be characterized as a suitable height for preventing arthropods from entering stored footwear 20.

Base 14 may have a length, as measured by the dimension of the longest side surface 18, of from about 24 inches to about 48 inches, in other embodiments, from about 24 inches to about 42 inches, in other embodiments, from about 24 inches to about 36 inches, and in other embodiments, about 30 inches. As suggested elsewhere herein, the length may be characterized as a suitable length to include one or two pairs of stored footwear. In one or more embodiments, the stored footwear may be adult sized boots.

Base 14 may have a width, as measured by the dimension of the second longest side surface 18, of from about 10 inches to about 24 inches, in other embodiments, from about 12 inches to about 24 inches, in other embodiments, from about 12 inches to about 18 inches, and in other embodiments, from about 18 inches to about 24 inches. As suggested elsewhere herein, the width may be characterized as a suitable width to include one or two pairs of stored footwear.

For purposes of this specification, any range or endpoint disclosed herein with the term "about" refers to those ranges or endpoints consistent with concepts of the present invention and may also describe the particular range or endpoint.

As shown in the Figures, in one or more embodiments, base 14 may be a rectangle shape. Other shapes may be suitable and other exemplary shapes include square, other quadrangular shapes, oval, and circle. As suggested above, the dimensions and shape of base 14 should be such that base 14 functions to store footwear 20 thereon.

With further reference to base 14, the top of base 14 may include three separate areas: a footwear storage location 22, a non-storage location 24, and a removably-adhered location 26. In some embodiments, such as shown in FIGS. 1-3, footwear storage location 22 and non-storage location 24 may be part of sunken portion 14B, and removably-adhered location 26 may therefore be raised therefrom. In other embodiments, such as shown in FIGS. 4-12, footwear storage location 22, non-storage location 24, and removably-adhered location 26 are of a similar or substantially similar height position. In embodiments where the outer perimeter of base 14 may be offset from the outer perimeter of the raised barrier (e.g. non-layered raised barrier 12B), the non-storage location 24 may include an outer location 24B outside of the outer perimeter of the raised barrier.

With further reference to footwear storage location 22, as shown in the Figures, footwear storage location 22, may be positioned generally centrally within top surface 16. Footwear storage location 22 may be one defined location or a plurality of defined locations. In one or more embodiments, as shown in the Figures, footwear storage location 22 may be two or four defined locations in the shape of pairs of footprints corresponding to or substantially corresponding to the outline shape of stored footwear 20. In other embodiments, footwear storage location 22 may be in the shape of an oval, circle, or rectangle.

In one or more embodiments, footwear storage location 22 may be a slight indentation formed into top surface 16. In other embodiments, footwear storage location 22 may be a layer positioned on top surface 16, such as paint or a sticker.

In one or more embodiments, footwear storage location 22 may be made of the same material as the rest of base 14, such as cardboard or plastic. In other embodiments, footwear storage location 22 may be made of a different material than non-storage location 24 and removably-adhered location 26. For example, in some embodiments, non-storage location 24 and removably-adhered location 26 may be made from plastic or cardboard, and footwear storage location 22 may be made of rubber to provide a gripping function for stored footwear 20.

In one or more embodiments, footwear storage location 22 may have a length of from about 6 inches to about 14 inches, in other embodiments, from about 8 inches to about 12 inches, in other embodiments, from about 6 inches to about 12 inches, in other embodiments, from about 6 inches to about 8 inches, and in other embodiments, from about 8 inches to about 10 inches.

As suggested above, top surface 16 of base 14 further includes non-storage location 24. As shown in the Figures, non-storage location 24 generally surrounds footwear storage location 22. At least a portion of non-storage location 24 is positioned internally from removably-adhered location 26. In one or more embodiments, outer location 24B of non-storage location 24 surrounds removably-adhered location 26 and a portion of non-storage location 24 is positioned internally from removably-adhered location 26. The outer shape of non-storage location 24 or a portion of non-storage location 24 generally corresponds with the internal perimeter of the raised barrier.

In one or more embodiments, non-storage location 24 may be made of the same material as the rest of base 14, such as cardboard or plastic. In other embodiments, non-storage location 24 may be made of a different material than footwear storage location 22 and removably-adhered location 26. For example, in some embodiments, non-storage location 24 may be made from a fabric for providing a suitable function for wiping off the bottom of stored footwear 20.

As suggested above, the top of base 14 further includes removably-adhered location 26. Removably-adhered location 26 is that location of base 14 generally corresponding to the bottom surface of the raised barrier (e.g. barrier 12A).

In one or more embodiments, removably-adhered location 26 may be made of the same material as the rest of base 14, such as cardboard or plastic. In other embodiments, removably-adhered location 26 may be made of a different material than footwear storage location 22 and non-storage location 24.

In one or more embodiments, the height of removably-adhered location 26 may be constant or substantially constant with non-storage location 24. In other embodiments, the height of removably-adhered location 26 may be slightly higher than non-storage location 24.

Whether the raised barrier is sidewalled raised barrier 12A, non-layered raised barrier 12B, support-article raised barrier 12C, or layered raised barrier 12D, the raised barrier may be characterized by certain common characteristics. The particulars of sidewalled raised barrier 12A, non-layered raised barrier 12B, support-article raised barrier 12C, or layered raised barrier 12D will be further described after the common characteristics.

The raised barrier includes an outer perimeter defined by an outer perimeter surface 28 and an inner perimeter defined by an inner perimeter surface 30. Inner perimeter surface 30 may be said to define an opening 32 through which stored footwear 20 may be placed in order to store footwear 20 on footwear storage location 22.

As shown in the Figures, in one or more embodiments, outer perimeter surface 28 and inner perimeter surface 30 are parallel or substantially parallel with each other with respect to corresponding portions of outer perimeter surface 28 and inner perimeter surface 30. In one or more embodiments, outer perimeter surface 28 and inner perimeter surface 30 extend orthogonally or substantially orthogonally from base 14.

As shown in the Figures, in one or more embodiments, the raised barrier (e.g. raised barrier 12A) may be a rectangular shape. Other shapes may be suitable and other exemplary shapes include square, other quadrangular shapes, oval, and circle. The dimensions and shape of the raised barrier should be such that footwear 20 can be stored therewithin.

The raised barrier includes a top surface 34 and a bottom surface (not seen) generally extending between outer perimeter surface 28 and inner perimeter surface 30. Top surface 34 and the bottom surface may be parallel or substantially parallel to the ground when footwear mat assembly 10 is positioned on the ground, and top surface 34 and the bottom surface may therefore be referred to as being positioned in the horizontal plane. In these embodiments, outer perimeter surface 28 and inner perimeter surface 30 have the same or substantially the same height.

As suggested above, the bottom surface of the raised barrier is adapted to be removably affixed to base 14. This serves to prevent arthropods from entering underneath the bottom surface of the raised barrier and into stored footwear 20. Also, the raised barrier can therefore be disposed of without needing to dispose base 14. As will be further discussed herein below, this enables a user to utilize a first one of the raised barriers until it is desired for disposal based on securing a plurality of arthropods. The first, used raised barrier can then be disposed of, and a second, new one of the raised barriers can then be provided onto the same base 14.

In one or more embodiments, the bottom surface of the raised barrier is removably affixed to base 14 by way of a removably-secure adhesive 36, which may also be described as a removably-secure adhesive layer 36. Removably-secure adhesive 36 may be present on either of or both of the bottom surface of the raised barrier and the removably-adhered location 26.

In one or more embodiments, removably-secure adhesive 36 for removably affixing the bottom surface of the raised barrier to base 14 is a removably-secure adhesive composition. Such removably-secure adhesive compositions will be further discussed herein below. In one or more embodiments, removably-secure adhesive 36 may be respective touch fasteners, such as hook-and-loop fasteners.

Removably-secure adhesive layer 36 may be characterized by the % coverage of the respective surface portion. In one or more embodiments, removably-secure adhesive layer 36 may cover at least 90%, in other embodiments, at least 95%, and in other embodiments, about 100% of the respective surface portion.

As suggested above, at least one surface of the raised barrier includes an arthropod-securing adhesive composition 38, which may also be described as an arthropod-securing adhesive layer 38. As will be further discussed herein below, the arthropod-securing adhesive composition 38 is capable of preventing arthropods from entering stored footwear 20.

In one or more embodiments, arthropod-securing adhesive layer 38 may be present only on top surface 34. In these or other embodiments, arthropod-securing adhesive layer 38 may be present on outer perimeter surface 28. In these or other embodiments, arthropod-securing adhesive layer 38 may be present on inner perimeter surface 30. In one or more embodiments, arthropod-securing adhesive layer 38 may be present on top surface 34, outer perimeter surface 28, and inner perimeter surface 30. In embodiments where the raised barrier is sidewalled raised barrier 12A, arthropod-securing adhesive layer 38 may be present within a channel between the inner and outer sidewalls. Inasmuch as the surface of the channel forms a respective uppermost part of the sidewalled raised barrier 12A, the channel surface may also be referred to as a top surface.

As shown in the Figures, based on being applied on the raised barrier arthropod-securing adhesive composition layer 38 is positioned above or away from top layer 16 of base 14. Thus, any arthropods would have to first make it past base 14 before reaching arthropod-securing adhesive composition layer 38. When arthropod-securing adhesive composition layer 38 is positioned on top surface 34, the below described suitable heights of the raised barrier therefore also described the distance that arthropod-securing adhesive composition layer 38 is away from top layer 16.

Arthropod-securing adhesive layer 38 may extend the entire length of the respective surface or surfaces. For example, arthropod-securing adhesive layer 38 may extend on top surface 34 the entire length from outer perimeter surface 28 to inner perimeter surface 30.

Arthropod-securing adhesive layer 38 may be characterized by the % coverage of the respective surface portion. In one or more embodiments, arthropod-securing adhesive layer 38 may cover at least 90%, in other embodiments, at least 95%, and in other embodiments, about 100% of the respective surface portion.

Arthropod-securing adhesive layer 38 may have a height of from about 0.03 inches to about 0.3 inches, in other embodiments, from about 0.05 inch to about 0.2 inches, in other embodiments, from about 0.03 inches to about 0.1 inches, in other embodiments, at least 0.05 inches, and in other embodiments, at least 0.1 inches.

In one or more embodiments, arthropod-securing adhesive layer 38 may include a release liner (not shown) prior to use. Release liners are generally known to the skilled person as paper or plastic-based film sheets that are utilized to prevent a sticky material (e.g. arthropod-securing adhesive layer 38) from prematurely adhering to another item. The release liner may be coated with a release agent, which provides a release effect against a sticky material (e.g. arthropod-securing adhesive layer 38). Any suitable release liner may be utilized.

In one or more embodiments, the raised barrier may be manufactured as a unitary shape. In other embodiments, the raised barrier may be manufactured as sub-components (e.g. as longitudinal members and latitudinal members) and then assembled into the final shape. Such assembly may be achieved by any suitable adhesive, including adhesive compositions, nails, and screws. As suggested elsewhere herein, in one or more embodiments, all materials used to form the raised barrier may be materials that are generally considered disposable.

The raised barrier may be further characterized by the dimensions thereof. As suggested above, the raised barrier should be of sufficient dimensions (e.g. perimeter thickness) such that the raised barrier and arthropod-securing adhesive composition 38 are suitably capable of preventing arthropods and other small creatures from entering stored footwear 20.

The raised barrier may have a height, as measured from the bottom surface to top surface 34 of from about 0.125 inches to about 0.25 inches, in other embodiments, from about 0.125 inches to about 0.5 inches, in other embodiments, from about 0.25 inches to about 0.5 inches, and in other embodiments, from about 0.125 inches to about 1 inch. In one or more embodiments, the height of the raised barrier is of a constant or substantially constant height across the entirety of the raised barrier.

The raised barrier may have a perimeter thickness, as measured from outer perimeter surface 28 to inner perimeter surface 30 of from about 0.5 inches to about 3 inches, in other embodiments, from about 0.5 inches to about 2 inches, in other embodiments, from about 1 inch to about 2 inches, in other embodiments, from about 1 inch to about 1½ inches, and in other embodiments, from about 1½ inches to about 2 inches. In one or more embodiments, the perimeter thickness of the raised barrier for any respective orthogonal points thereof may be of a constant or substantially constant thickness across the entirety of the raised barrier.

Raised barrier 12A, 12B may have a length, as measured by the dimension of the longest side portion of outer perimeter surface 28, of from about 24 inches to about 48 inches, in other embodiments, from about 24 inches to about 42 inches, in other embodiments, from about 24 inches to about 36 inches, and in other embodiments, about 30 inches.

Raised barrier 12A, 12B may have a width, as measured by the dimension of the second longest side portion of outer perimeter surface 28, of from about 10 inches to about 24 inches, in other embodiments, from about 12 inches to about 24 inches, in other embodiments, from about 12 inches to about 18 inches, and in other embodiments, from about 18 inches to about 24 inches.

The above dimensions for length and width generally describe the dimensions for the outer perimeter of the raised barrier. These dimensions, in addition to the disclosed perimeter thickness, can be utilized to determine suitable dimensions with respect to the inner perimeter of the raised barrier.

As suggested above, in one or more embodiments, the raised barrier may be sidewalled raised barrier 12A. Sidewalled raised barrier 12A includes the outer perimeter surface 28 as an outer sidewall 28 and the inner perimeter surface 30 as an inner sidewall 30. The outer sidewall 28 and inner sidewall 30 define a channel for receiving arthropod-securing adhesive layer 38. The combination of outer sidewall 28, inner sidewall 30, and the channel may collectively be referred to as a support article 40.

As suggested above, in one or more embodiments, the raised barrier may be non-layered raised barrier 12B. Non-layered raised barrier 12B includes the arthropod-securing adhesive layer 38 as a layer indirectly or directly on top of removably-secure adhesive layer 36. Non-layered raised barrier 12B may include a release liner in between removably-secure adhesive layer 36 and arthropod-securing adhesive layer 38. In other embodiments, arthropod-securing adhesive layer 38 is a single layer directly on top of removably-secure adhesive layer 36. In one or more embodiments, a tab 50B may be present for easier lifting of and removal of arthropod-securing adhesive layer 38.

As suggested above, in one or more embodiments, the raised barrier may be support-article raised barrier 12C. Support-article raised barrier 12C includes a non-layered support article 40 and the arthropod-securing adhesive layer 38, and optionally one or more of the removably-secure adhesive layer 36 and a release liner for arthropod-securing adhesive layer 38.

By reference to the support article 40 as a non-layered article, this generally refers to the support article 40 not including distinct compositional layers. For example, support article 40 may be made entirely of cardboard. Other suitable materials for support article 40 may include plastic, strong paper, and wood. As suggested above, the material for support article 40 may be any material generally considered as disposable.

As suggested above, in one or more embodiments, the raised barrier may be layered raised barrier 12D. Layered raised barrier 12D includes a layered support article 42 and the arthropod-securing adhesive layer 38, and optionally one or more of the removably-secure adhesive layer 36 and a release liner for arthropod-securing adhesive layer 38.

Layered support article 42 includes arthropod-securing adhesive layer 38 positioned on a release liner layer 44. Release liner layer 44 may be any suitable release liner, such as disclosed above with respect to the optional release liner for arthropod-securing adhesive layer 38. Release liner layer 44 may also be described as a backing layer 44 for arthropod-securing adhesive layer 38.

Release liner layer 44 is directly or indirectly disposed on an arthropod-securing adhesive second layer 46. In one or more embodiments, an optional intermediate release liner layer 48 or backing layer 48 may be provided, such that release liner layer 44 is indirectly disposed on arthropod-securing adhesive second layer 46. Intermediate release liner layer 48 may be any suitable release liner.

In one or more embodiments, optional intermediate release liner layer 48 is not provided, such that release liner layer 44 is directly disposed on arthropod-securing adhesive second layer 46. In these embodiments, release liner layer 44 is configured as to not adhere to arthropod-securing adhesive second layer 46.

This configuration of even further arthropod-securing adhesive layers (e.g. layer 46), positioned on even further release liner layer, with or without even further intermediate release liner layers, may continue up to any suitable number of layers. In one or more embodiments, layered raised barrier 12B includes at least 10, in other embodiments, at least 20, and in other embodiments, at least 30 arthropod-securing adhesive layers.

After some use of layered raised barrier 12D, the top layer of arthropod-securing adhesive layer (e.g. arthropod-securing adhesive layer 38), and release liner layer 44, and optionally intermediate release liner layer 48, can be removed to thereby expose the next layer of arthropod-securing adhesive layer (e.g. arthropod-securing adhesive layer 46).

In one or more embodiments, a tab 50 may be present for easier lifting of and removal of the top arthropod-securing adhesive layer (e.g. arthropod-securing adhesive layer 38). Tab 50 may be present as an additional material on top of the top arthropod-securing adhesive layer, or may be a portion of the release liner layer that does not include the arthropod-securing adhesive composition.

The arthropod-securing adhesive compositions described herein may be any suitable composition to cause the permanent attachment of an arthropod thereto upon the arthropod contacting the arthropod-securing adhesive composition. This may be referred to as the arthropod-securing adhesive composition having suitable surface tack. Suitable arthropod-securing adhesive compositions are generally known in the art, and many are commercially available. Exemplary arthropod-securing adhesive compositions may be disclosed in U.S. Pat. Nos. 2,911,756 and 5,517,802; and U.S. Publication No. 2007/0157506, which are each incorporated by reference herein. Examples of commercially available arthropod-securing adhesive compositions are those sold under the trade names TOMCAT and CATCHMASTER. Some of these compositions sold under the trade name TOMCAT include eugenol. Some of these compositions sold under the trade name CATCHMASTER are sold as Bulk Glue.

In one or more embodiments, the arthropod-securing adhesive composition may be devoid or substantially devoid of polytetrafluoroethylene (PTFE). In one or more embodiments, the present arthropod-securing adhesive composition may be devoid or substantially devoid of aluminum silicate.

The removably-secure adhesive compositions described herein may be of any suitable composition that is generally known in the art as forming a temporary bond, which can be removed even after a predetermined amount of time. Certain of these compositions are generally known as removable pressure-sensitive adhesives. The removably-secure adhesive composition should be removable with minimal or no damage to the respective adherend surface. In one or more embodiments, the removably-secure adhesive composition does not leave residue or substantial residue on the adherend surface. In one or more embodiments, the removably-secure adhesive composition may be used repeatedly. Applications where such removably-secure adhesive compositions are generally known in the art include surface films, masking tape, note papers, price marking labels, and skin contact. Exemplary removably-secure adhesive compositions may be disclosed in U.S. Publication No. 2004/0187377, which is incorporated by reference herein.

As suggested above, the bottom surface of the raised barrier is adapted to be removably affixed to base 14, such that the raised barrier can be disposed of without needing to dispose base 14. As suggested above, a first one of the raised barriers may be used until it is desired for disposal, i.e. becomes a used raised barrier, and then a second one of the raised barriers, i.e. a new raised barrier, can be provided onto the same base 14. Thus, in one or more embodiments, a kit including footwear mat assembly 10 may be provided with one base 14 and a plurality of the raised barriers. In one or more embodiments, a kit including footwear mat assembly 10 may be provided with one base 14 and two of the raised barriers.

In addition to any advantages discussed herein above, it should be appreciated that footwear mat assembly 10 disclosed herein may provide one or more other advantages.

In one or more embodiments, footwear mat assembly 10 may be devoid of an arthropod attracting fluid, such as carbon dioxide or those fluids may form carbon dioxide. Though, as suggested above, other embodiments of footwear mat assembly 10 may include an arthropod attracting material, such as eugenol.

In one or more embodiments, footwear mat assembly 10 may be devoid of diatomaceous earth.

In one or more embodiments, footwear mat assembly 10 all respective surfaces are orthogonal or substantially orthogonal with the corresponding surfaces, such that footwear mat assembly 10 may be said to be devoid of angled surfaces that are not orthogonal.

In one or more embodiments, the various surfaces of footwear mat assembly 10 do not need to be roughened or covered with a rougher material.

In one or more embodiments, footwear mat assembly 10 may be said to be devoid of moats, since footwear storage location 22 and non-storage location 24 do not include the arthropod-securing adhesive composition.

In light of the foregoing, it should be appreciated that the present invention advances the art by providing an improved footwear mat assembly. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A footwear mat assembly for preventing arthropods from entering footwear stored thereon, the footwear mat assembly comprising
    a base including
        a base top surface including
            a footwear storage location adapted to receive a pair of footwear, and
    a raised barrier including
        a barrier bottom surface adhesively and removably secured to the base top surface,
        a barrier top surface carrying an arthropod-securing adhesive composition layer, and
        a barrier inner perimeter defining an opening adapted to receive the pair of footwear therethrough for placement on the footwear storage location.

2. The footwear mat assembly of claim 1,
    the base further including a base outer perimeter, and
    the raised barrier further including a barrier outer perimeter,
        wherein the base outer perimeter substantially corresponds with the barrier outer perimeter.

3. The footwear mat assembly of claim 2, the base top surface further including
    a non-storage location, wherein the footwear storage location is generally centrally located within the non-storage location, and
    a removably-adhered location defining the adhesively secured location with the barrier bottom surface.

4. The footwear mat assembly of claim 2, wherein the barrier inner perimeter is an inner sidewall and the barrier outer perimeter is an outer sidewall, wherein the barrier top surface is a channel extending between the inner sidewall and the outer sidewall.

5. The footwear mat assembly of claim 2, wherein the barrier outer perimeter has a length of from about 24 inches to about 48 inches and a width of from about 12 inches to about 24 inches.

6. The footwear mat assembly of claim 5, wherein the raised barrier has a height of from about 0.125 inches to about 1 inch.

7. The footwear mat assembly of claim 6, wherein the raised barrier has a perimeter thickness of from about 1 inch to about 2 inches.

8. The footwear mat assembly of claim 7, wherein the arthropod-securing adhesive composition layer has a height of from about 0.03 inches to about 0.3 inches.

9. The footwear mat assembly of claim 8, wherein the base and the raised barrier are both rectangular shaped.

10. The footwear mat assembly of claim 2, wherein the footwear storage location includes two defined locations generally corresponding to the shape of the pair of footwear.

11. The footwear mat assembly of claim 10, wherein the defined locations have a length of from about 6 inches to about 12 inches.

12. The footwear mat assembly of claim 2, wherein the footwear storage location is adapted to receive two pairs of footwear, wherein the footwear storage location includes four defined locations generally corresponding to the shape of the two pairs of footwear.

13. The footwear mat assembly of claim 2, the base further including side surfaces having a height, wherein the base top surface is positioned below the height of the side surfaces to thereby define a sunken portion of the base.

14. The footwear mat assembly of claim 2, wherein the base and the raised barrier are made of plastic.

15. A kit comprising the footwear mat assembly of claim 2, wherein the raised barrier is a first barrier adapted to be removed and disposed, the kit further comprising a second of the raised barriers as a second barrier, the second barrier adapted to be adhesively and removably secured to the base top surface following disposal of the first barrier.

16. A footwear mat assembly for preventing arthropods from entering footwear stored thereon, the footwear mat assembly comprising
    a base including
        a base top surface including
            a footwear storage location adapted to receive a pair of footwear, the footwear storage location including two defined locations generally corresponding to the shape of a pair of footwear to be stored, and
    a raised barrier including a barrier bottom surface adhesively and removably secured to the base top surface, a barrier outer sidewall defining an outer perimeter of the raised barrier, a barrier inner sidewall defining an opening adapted to receive the pair of footwear to be stored therethrough for placement on the footwear storage location, and a channel extending between the barrier outer sidewall and the barrier inner sidewall, the channel carrying an arthropod-securing adhesive composition layer.

17. The footwear mat assembly of claim 16, the base further including side surfaces having a height, wherein the base top surface is positioned below the height of the side surfaces to thereby define a sunken portion of the base.

18. A kit comprising the footwear mat assembly of claim 16, wherein the raised barrier is a first barrier adapted to be removed and disposed, the kit further comprising a second of the raised barriers as a second barrier, the second barrier adapted to be adhesively and removably secured to the base top surface following disposal of the first barrier.

\* \* \* \* \*